(12) United States Patent
Dudar

(10) Patent No.: US 12,534,065 B2
(45) Date of Patent: Jan. 27, 2026

(54) PARKING ASSISTANCE SYSTEMS AND METHODS

(71) Applicant: Ford Global Technologies, LLC, Dearborn, MI (US)

(72) Inventor: Aed M. Dudar, Canton, MI (US)

( * ) Notice: Subject to any disclaimer, the term of this patent is extended or adjusted under 35 U.S.C. 154(b) by 386 days.

(21) Appl. No.: 18/173,554

(22) Filed: Feb. 23, 2023

(65) Prior Publication Data

US 2024/0286601 A1  Aug. 29, 2024

(51) Int. Cl.
*B60W 30/06* (2006.01)
*B60W 60/00* (2020.01)

(52) U.S. Cl.
CPC .......... *B60W 30/06* (2013.01); *B60W 60/001* (2020.02); *B60W 2554/20* (2020.02); *B60W 2554/404* (2020.02); *B60W 2556/65* (2020.02); *B60W 2756/10* (2020.02)

(58) Field of Classification Search
CPC ............... B60W 30/06; B60W 60/001; B60W 2554/20; B60W 2756/10; B60W 2554/404; B60W 2556/65
USPC ......................................................... 701/23
See application file for complete search history.

(56) References Cited

U.S. PATENT DOCUMENTS

| | | | |
|---|---|---|---|
| 9,174,676 B2 * | 11/2015 | Jecker | B62D 15/0285 |
| 9,418,551 B2 * | 8/2016 | Kavaler | B60W 30/06 |
| 10,286,904 B2 | 5/2019 | Yaldo et al. | |
| 11,458,960 B2 * | 10/2022 | Nessler | G08G 1/22 |
| 2014/0180523 A1 * | 6/2014 | Reichel | B62D 15/0285 |
| | | | 701/23 |
| 2017/0329346 A1 | 11/2017 | Latotzki | |

(Continued)

FOREIGN PATENT DOCUMENTS

| | | | | |
|---|---|---|---|---|
| DE | 102011084588 A1 * | 4/2013 | ............ | B60W 30/06 |
| DE | 102018113883 A1 * | 12/2018 | ............ | B60W 30/06 |

(Continued)

OTHER PUBLICATIONS

Ma, Shidian et al. "Parking Space Recognition Method Based on Parking Space Feature Construction in the Scene of Autonomous Valet Parking." Applied sciences 11.6 (2021): 2759-. Web. (Year: 2021).*

(Continued)

*Primary Examiner* — Ramya P Burgess
*Assistant Examiner* — Keith A von Volkenburg
(74) *Attorney, Agent, or Firm* — Emily Drake; Eversheds Sutherland (US) LLP

(57) ABSTRACT

This disclosure is generally directed to parking assistance systems and methods. An example method can include determining, by a processor of a parking assistance system in a first vehicle, a first swing out arc radius of a door of the first vehicle and/or a second swing out arc radius of a door of a second vehicle that is parked adjacent to the first vehicle. The swing out arc radius of a door may, for example, be determined based on vehicle specifications or on data provided by a distance measuring sensor. The processor may then provide to an autonomous driving system of the first vehicle and/or a driver of the first vehicle, guidance for positioning the first vehicle in a parking spot, based, on the first swing out arc radius of the door of the first vehicle and/or the second swing out arc radius of the door of the second vehicle.

20 Claims, 10 Drawing Sheets

(56) References Cited

U.S. PATENT DOCUMENTS

| | | | | |
|---|---|---|---|---|
| 2017/0365170 | A1* | 12/2017 | Lazic | G05D 1/0287 |
| 2018/0162384 | A1* | 6/2018 | Kim | B60W 30/06 |
| 2019/0308609 | A1 | 10/2019 | Gieseke et al. | |
| 2020/0148197 | A1* | 5/2020 | Yoon | H04W 4/44 |
| 2020/0254928 | A1 | 8/2020 | Monteiro et al. | |
| 2021/0026370 | A1* | 1/2021 | Taylor | G05D 1/0287 |
| 2021/0146915 | A1 | 5/2021 | Niewiadomski et al. | |
| 2024/0043075 | A1* | 2/2024 | Johannes | B25J 9/1679 |
| 2024/0103171 | A1* | 3/2024 | Wyffels | G01S 17/66 |
| 2024/0132056 | A1* | 4/2024 | DiGioacchino | B60W 30/06 |
| 2024/0149917 | A1* | 5/2024 | Flynn | B60W 30/16 |
| 2024/0199047 | A1* | 6/2024 | Agrawal | B60W 50/14 |

FOREIGN PATENT DOCUMENTS

| | | | |
|---|---|---|---|
| DE | 102020117770 A1 * | 1/2022 | |
| DE | 102020131933 A1 * | 6/2022 | |

OTHER PUBLICATIONS

Hicham Lahdili et al., New Approach for Self-Parking Management System, SPC International Journal of Engineering & Technology, Oct. 2018, 2765-2772.

* cited by examiner

PARKING ASSISTANCE SYSTEMS AND METHODS

BACKGROUND

Parking spots are typically defined by lines painted on the ground and drivers use these lines to park their vehicles inside the parking spots. An aware driver may park a vehicle inside a parking spot in a manner that provides adequate clearance on all sides of the vehicle. For example, adequate clearance may be provided between the parked vehicle and another vehicle parked in an adjacent parking spot so as to allow opening of a door of one vehicle without the door coming in contact with the other vehicle. However, some drivers may not park with awareness. For example, a driver may park a vehicle in a parking spot at an improper angle, thereby causing some parts of the vehicle to be undesirably close to another vehicle parked in an adjacent parking spot. As another example, a driver may park a vehicle in a parking spot such that a part of the vehicle protrudes into an adjacent parking spot, thereby preventing the use of the adjacent parking spot by another vehicle. In such scenarios, an aware driver may seek to maneuver and park his vehicle in such a manner that eliminates, or at least minimizes, the chances of his/her vehicle door making contact with a neighboring vehicle. An autonomous vehicle may attempt a similar maneuver for a similar reason. It is therefore desirable to provide solutions that assist the driver of a vehicle or a computer of an autonomous vehicle carry out such maneuvers.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
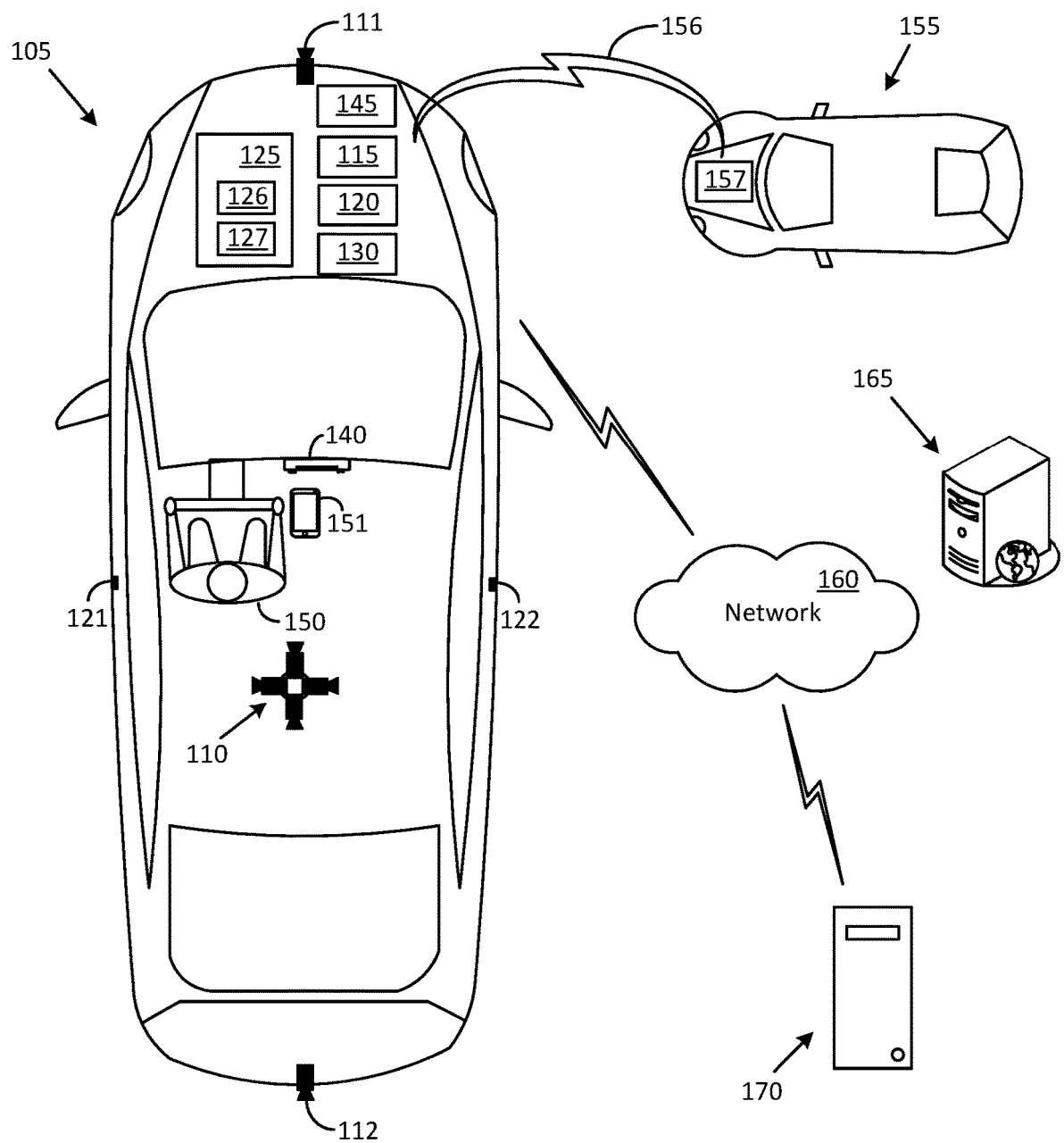
FIG. 1 shows an example vehicle that includes a parking assistance system in accordance with an embodiment of the disclosure.

In terms of a general overview, certain embodiments described in this disclosure are generally directed to parking assistance systems and methods. In an example implementation, a method can include receiving, by a first processor of a first parking assistance system in a first vehicle, from one or more sensing devices, one or more sensor signals. The first processor may determine, based on the one or more sensor signals, a first position of the first vehicle in a first parking spot and a first separation distance between the first vehicle and a second vehicle that is parked in a second parking spot located adjacent to the first parking spot. The first processor may then provide to a first autonomous driving system of the first vehicle and/or a driver of the first vehicle, a guidance for positioning the first vehicle in the first parking spot, based, at least in part, on the first separation distance between the first vehicle and the second vehicle.

In another example implementation, a method can include determining, by a first processor of a first parking assistance system in a first vehicle, at least one of a first swing out arc radius of a door of the first vehicle or a second swing out arc radius of a door of a second vehicle that is parked adjacent to the first vehicle. The processor may then provide to a first autonomous driving system of the first vehicle and/or a driver of the first vehicle, a guidance for repositioning the first vehicle in a first parking spot, based, at least in part, on the first swing out arc radius of the door of the first vehicle or the second swing out arc radius of the door of the second vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "a parking spot" as used in this disclosure refers to one or more of various types of spaces that may be used for parking a vehicle, and is intended to encompass various alternative phrases such as "a parking space," "a parking slot," or "a parking area." A parking spot is typically indicated by lines painted on a road surface, a parking garage, a parking lot, or any other surface upon which a vehicle may be parked. However, in some cases, as applicable to this disclosure, a parking spot for a vehicle can be an unmarked area, such as, for example, an unpaved road or un unpaved surface (a field, for example).

The word "vehicle" as used herein can be any of various types of vehicles such as, for example, a gasoline powered vehicle, an electric vehicle, a hybrid electric vehicle, a car, a sports utility vehicle (SUV), a truck, a van, a semi-trailer truck, a bus, a driver-operated vehicle, or an autonomous vehicle. The phrase "autonomous vehicle" as used in this disclosure generally refers to a vehicle that can perform at least a few operations without human intervention. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment events. The level of human intervention is very low. Level 5 (L5) vehicles are fully autonomous vehicles that do not involve human participation. The label "autonomous driving system" as used herein can be applicable to any vehicle ranging from a Level 2 vehicle to a Level 5 vehicle.

The phrase "software application" as used herein with respect to a personal device such as, for example, a smartphone, refers to various types of code (firmware, software, machine code etc.) that is installed in the personal device and may be executed by the use of a human machine interface (HMI). The term HMI as used herein encompasses a graphical user interface (GUI) as well as various other interfaces.

The word "information," as used herein with reference to a device, refers to any of various forms of data produced by the device such as, for example, digital data, sensor signal data, and distance data. The word "sensor" may be used interchangeably with the word "detector." Either word as used in this disclosure refers to various devices such as an ultrasonic sensor that may be used to perform operations such as identifying the presence of an object, performing a distance measurement, and/or executing a measurement procedure. The sensors and detectors may be installed at various locations in a vehicle and can include, for example, one or more cameras, ultrasonic detectors, radar detectors, sonar detectors, light detection and ranging (LIDAR) devices, and audio devices (microphones). The word "data" may be used interchangeably with the word "information." Either word pertains to any of various forms of input to a processor.

It must be understood that any part of the description herein that refers to an action performed by a device (such as, for example, an action performed by a parking assistance system) is typically carried out by a processor of the device, based on executing computer-executable instructions stored in a memory. However, in some scenarios, an action may be performed by a human being, such as, for example, performed by a driver of a vehicle.

It must also be understood that words such as "implementation," "configuration," "application," "scenario," "situation," "case," and "situation" as used herein represent abbreviated versions of the phrase "In an example ("implementation," "configuration," "application," "scenario," "situation," "case," "approach," and "situation") in accordance with the disclosure." The word "example" as used herein is intended to be non-exclusionary and non-limiting in nature.

FIG. 1 shows an example vehicle 105 that includes a parking assistance system 125 in accordance with an embodiment of the disclosure. The vehicle 105 may further include a vehicle computer 145, a communications system 115, an autonomous driving system 120, a sensor system 130, and an infotainment system 140. The parking assistance system 125 can include a processor 126 and a memory 127 in which is stored computer-executable instructions that can be executed by the processor 126 to perform various operations in accordance with the disclosure.

In the example embodiment illustrated in FIG. 1, the vehicle 105 is a driver-operated vehicle operated by a driver 150. The parking assistance system 125 may execute various operations to assist the driver 150 and/or may perform various operations autonomously (with the driver 150 being present or not present in the vehicle 105). In some scenarios, the parking assistance system 125 may provide guidance and/or instructions to the driver 150, for performing some operations in accordance with the disclosure, via the infotainment system 140 and/or via a personal device 151 of the driver 150. The personal device 151 can be, for example, a smartphone, a tablet computer, a laptop computer, or a wearable computer. The personal device 151 is generally placed in a manner that allows the driver 150 to operate the vehicle 105 in an unhampered manner, such as, for example, on a device cradle attached to a front windshield of the vehicle 105 or a console of the vehicle 105.

In another example, the vehicle 105 is an autonomous vehicle that does not have a driver. When no driver is present, various driving-related operations and other operations of the vehicle 105 may be performed by the autonomous driving system 120. The autonomous driving system 120 can include components such as, for example, a processor (not shown) and a memory (not shown). The parking assistance system 125 may provide instructions to the autonomous driving system 120 for performing various operations in accordance with the disclosure such as, for example, for parking the vehicle 105 in a parking spot in a desired manner.

The vehicle computer 145 may perform various functions such as, for example, controlling engine operations (fuel injection, speed control, emissions control, braking, etc.), managing climate controls (air conditioning, heating etc.), detecting airbag activations, detecting component events, detecting engine malfunctions, and issuing alerts (check engine light, bulb failure, low tire pressure, vehicle in blind spot, etc.). In some cases, such as, for example, when the vehicle 105 is an autonomous vehicle, the autonomous driving system 120 may either perform some or all functions of the vehicle computer 145. Accordingly, in some implementations, the autonomous driving system 120 may be integrated into the vehicle computer 145.

The infotainment system 140 can be an integrated unit that includes various components such as, for example, a radio, a CD player, a video player, and a navigation system. In an example implementation, the infotainment system 140 may include a display having a graphical user interface (GUI) for use by the driver 150 of the vehicle 105. The driver may, for example, use the GUI to request guidance from the parking assistance system 125 to park, or to re-park, the vehicle 105, when one or more neighboring vehicles are present.

The infotainment system 140 may also be used to display various images captured by one or more cameras provided in the vehicle 105. For example, the infotainment system 140 may be used to display images of objects behind the vehicle 105 when the driver 150 has placed a gear shifter of the vehicle 105 in reverse.

One or more cameras may be mounted on various parts of the vehicle 105 and communicatively coupled to the parking assistance system 125. In an example implementation, a digital camera may be provided on the vehicle 105 and configured to capture still images that are conveyed to the parking assistance system 125 for performing various operations in accordance with the disclosure. In another example implementation, a video camera may be provided on the vehicle 105 and configured to capture video clips or streaming video that are conveyed to the parking assistance system 125 for performing various operations in accordance with the disclosure.

An example camera 110 having a 360-degree field of view may be mounted upon the roof of the vehicle 105. The parking assistance system 125 may control various operations of the cameras, such as, for example, by conveying signals to the camera 110 for capturing images of other vehicles, particularly, images of neighboring vehicles that are parked adjacent to the vehicle 105. Another example camera 111 may be mounted on a front bumper of the vehicle 105, for example, and configured to capture images of a ground area underneath, and in front of, the vehicle 105. The images may be conveyed from the camera 111 to the parking assistance system 125, which may evaluate the images to obtain information about a parking spot, and particularly, information about painted lines that define the parking spot. The images may also be evaluated by the parking assistance system 125 to determine a position of the vehicle 105 with respect to the painted lines (aligned with, centered between, askew, on top of, straddling, traversing, etc.)

An example camera 112 that may be mounted on a rear bumper of the vehicle 105, for example, and configured to capture images of a ground area underneath and behind the vehicle 105. Images captured by the camera 112 may be conveyed to the parking assistance system 125 for use in a manner similar to that described above with reference to the camera 111.

The sensor system 130 can include various types of sensing and/or detection devices. In the illustrated example, the vehicle 105 includes a distance measuring sensor 121 mounted on a driver-side door of the vehicle 105 and a distance measuring sensor 122 mounted on a passenger-side door of the vehicle 105. In other example implantations, the distance measuring sensor 121 and/or the distance measuring sensor 122 can be mounted on the vehicle 105 at other locations on the side of the vehicle 105, such as, for example, on a side pillar, on a rear-view mirror, or on a window frame. The distance measuring sensor 121 can be, for example, an ultrasonic detector, a radar detector, a sonar detector, or a light detection and ranging (LIDAR) device configured to provide to the parking assistance system 125, distance information between the driver-side door of the vehicle 105 and a door of any other vehicle that may be parked adjacent to the vehicle 105 on the driver side. The distance measuring sensor 122 can be a similar device configured to distance information between the passenger-side door of the vehicle 105 and a door of any other vehicle that may be parked adjacent to the vehicle 105 on the passenger side.

The communications system 115 is configured to allow various components of the vehicle 105 such as, for example, the parking assistance system 125, the vehicle computer 145, and the autonomous driving system 120 to communicate with each other and to communicate with devices located outside the vehicle 105. Some example devices located outside the vehicle 105 can include a server computer 170, a cloud computer 165, and a parking assistance system 157 provided in a vehicle 155. The communications system 115 may communicate with the devices located outside the vehicle 105 either directly or via a network 160. One example of direct communications can be a vehicle-to-vehicle (V2V) communications that may be carried out via a wireless link 156 between the parking assistance system 125 of the vehicle 105 and the parking assistance system 157 of the vehicle 155. One example of communications carried out via the communications system 115 and the network 160 is a wireless communication between the parking assistance system 125 and the server computer 170.

The network 160 may include any one, or a combination of networks, such as a local area network (LAN), a wide area network (WAN), a telephone network, a cellular network, a cable network, a wireless network, and/or private/public networks such as the Internet. For example, the network 160 may support communication technologies such as Bluetooth, cellular, near-field communication (NFC), Wi-Fi, Wi-Fi direct, machine-to-machine communication, and/or man-to-machine communication. At least one portion of the network 160 can include a wireless communication link that allows the server computer 170 to wirelessly communicate with the parking assistance system 125 in the vehicle 105. The server computer 170 may cooperate with the parking assistance system 125 to carry out some operations associated with parking the vehicle 105 in accordance with the disclosure. For example, the server computer 170 may be used to store various kinds of information such as vehicle-related information that can be used by the parking assistance system 125. The vehicle-related information can include dimensional data of various components of various vehicles, and can particularly include dimensional information of doors of various types of vehicles (including doors of the vehicle 105). The cloud computer 165 may be configured similar to the server computer 170 and may perform similar functions with respect to the parking assistance system 125.

Figure 2:
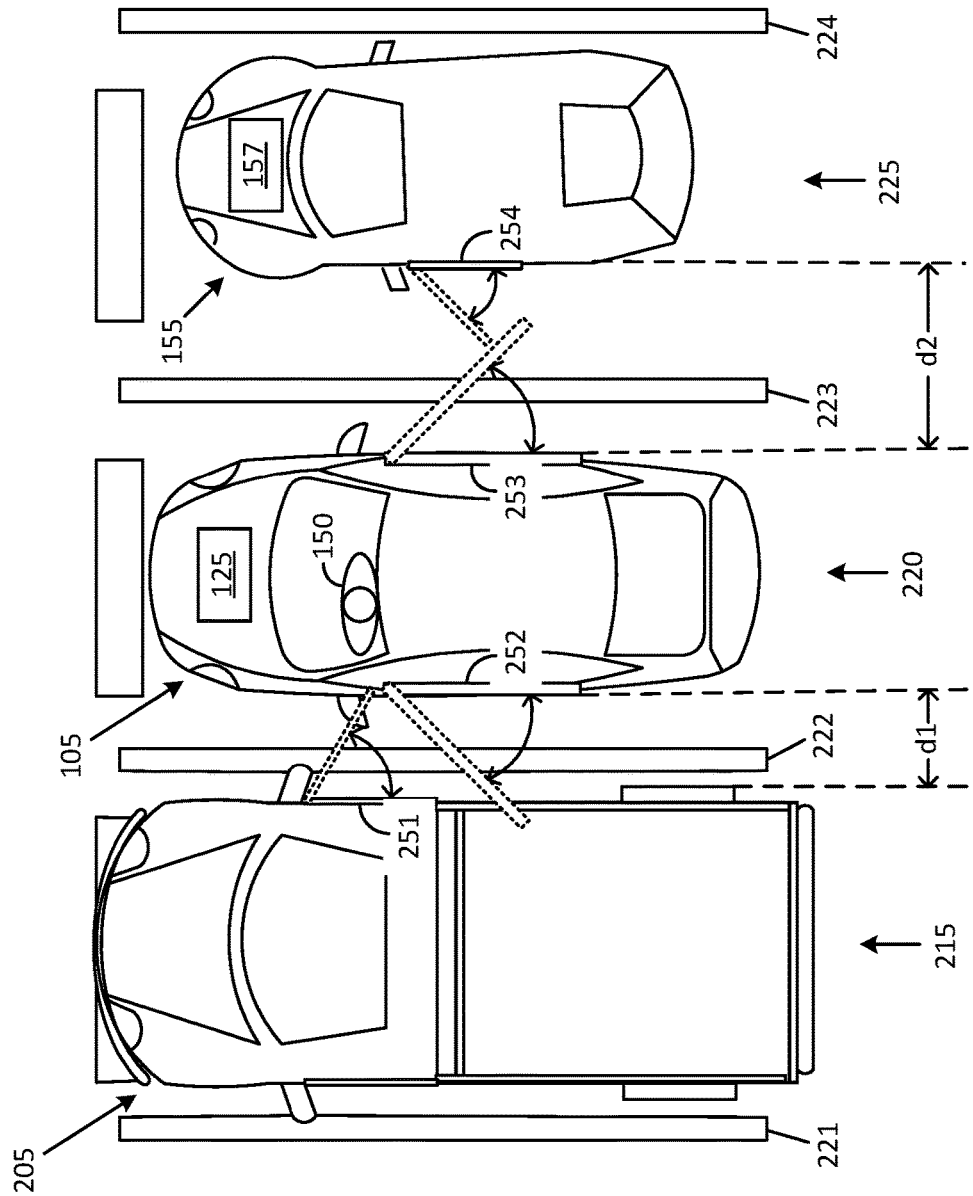
FIG. 2 shows a first example scenario where a parking assistance system of a vehicle can be used in accordance with an embodiment of the disclosure.

FIG. 2 shows a first example scenario where the parking assistance system 125 of the vehicle 105 can be used in accordance with an embodiment of the disclosure. In this scenario, the vehicle 105 is parked in a parking spot 220. A vehicle 205 is parked in a parking spot 215 adjacent to the parking spot 220, on a driver side of the vehicle 105. The vehicle 155 is parked in a parking spot 225 adjacent to the parking spot 220, on a passenger side of the vehicle 105. It must be understood that the description below is equally applicable when a single vehicle is parked beside the vehicle 105 such as, for example, when the vehicle 205 is parked beside the vehicle 105 and the vehicle 155 is not present. It must also be understood that the description below is equally applicable when two or more of the illustrated vehicles are parked in an unmarked area where no painted lines are present.

A pair of painted lines (a painted line 221 and a painted line 222) identify the parking spot 215. The parking spot 220 may be identified by another pair of painted lines (the painted line 222 and a painted line 223). The parking spot 225 may be identified by yet another pair of painted lines (the painted line 223 and a painted line 224).

The vehicle 205 that is parked in the parking spot 215 may be, for example, a wide-body truck that occupies a large portion of the parking spot 215. A passenger-side door 251 of the vehicle 205 has a swing-out arc radius that can cause the passenger-side door 251 to make undesirable contact with a portion of the vehicle 105 (a driver-side rear view mirror in the illustrated example) when the passenger-side door 251 is opened.

The vehicle 105 can be, for example, a two-door vehicle. A driver-side door 252 may have a swing-out arc radius that can cause the driver-side door 252 to make undesirable contact with a portion of the vehicle 205 (a body of the vehicle 205 in the illustrated example) when the driver-side door 252 is opened.

Furthermore, in this case, a separation distance "d1" between the vehicle 105 and the vehicle 205 is inadequate to prevent the passenger-side door 251 of the vehicle 205 from making contact with a portion of the vehicle 105 and also to prevent the driver-side door 252 of the vehicle 105 from making contact with a portion of the vehicle 205.

The vehicle 155, may, for example, be a small vehicle that is parked off-center in the parking spot 225, such that the vehicle 155 is closer to the painted line 224 than the painted line 223. In this example scenario, a driver-side door 254 of the vehicle 155 has a swing-out arc radius that is relatively small in comparison to the swing-out arc radius of a passenger-side door 253 of the vehicle 105.

The passenger-side door 253 of the vehicle 105 may have the same swing-out arc radius as the driver-side door 252. However, the passenger-side door 253 does not pose a problem with respect to the vehicle 155 unless the driver-side door 254 of the vehicle 155 is opened concurrently with opening of the passenger-side door 253 of the vehicle 105 first vehicle. The odds of the concurrent opening are very small because at least one of the occupants of the vehicle 105 and/or the vehicle 155 can foresee and prevent the occurrence of such an event.

A separation distance "d2" between the vehicle 105 and the vehicle 155, which is greater than the separation distance "d1" between the vehicle 105 and the vehicle 205, may be adequate to prevent the passenger-side door 253 of the vehicle 105 from making contact with a portion of the vehicle 155 and to prevent the driver-side door 254 of the vehicle 155 from making contact with a portion of the vehicle 105.

In view of the scenario described above, it is desirable to reposition the vehicle 105 so as to minimize, or to prevent, the driver-side door 252 of the vehicle 105 from making contact with a portion of the vehicle 205 and/or the passenger-side door 251 of the vehicle 205 from making contact with a portion of the vehicle 105. The parking assistance system 125 of the vehicle 105 can be used in accordance with an embodiment of the disclosure to assist the driver 150 of the vehicle 105 or the autonomous driving system 120 of the vehicle 105 to reposition the vehicle 105.

Figure 3:
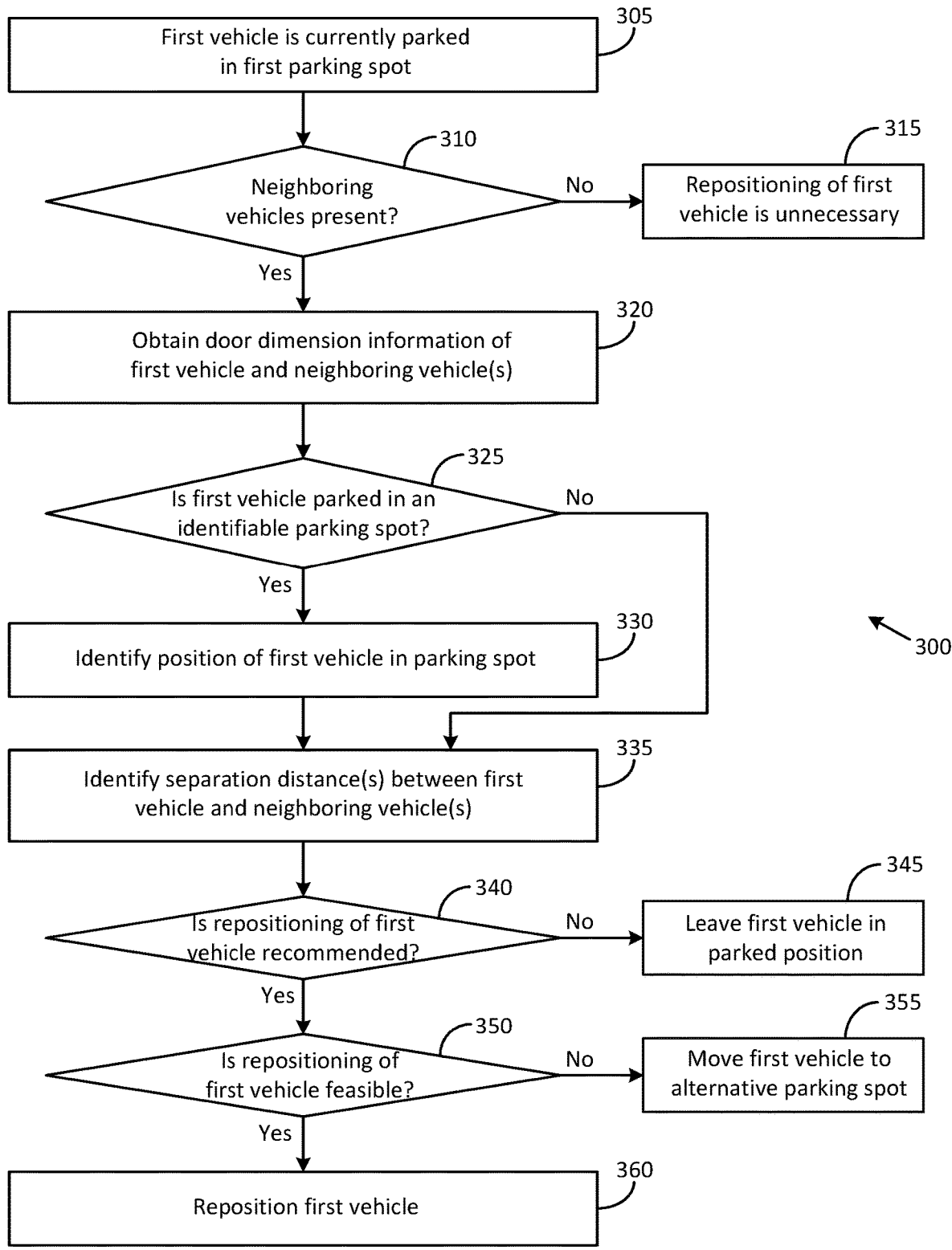
FIG. 3 shows a flowchart of an example method of operation of a parking assistance system in accordance with an embodiment of the disclosure.

An example way to do so is described below with respect to FIG. 3, which shows a flowchart 300 of an example method of operation of a parking assistance system in accordance with an embodiment of the disclosure. The flowchart 300 (and the flowchart 500 described below) illustrates a sequence of operations that can be implemented in hardware, software, or a combination thereof. In the context of software, the operations represent computer-executable instructions stored on one or more non-transitory computer-readable media such as the memory 127 of the parking assistance system 125, that, when executed by one or more processors such as the processor 126 of the parking assistance system 125, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 305, a first vehicle is currently parked in a first parking spot. In an example scenario, the first parking spot may be identifiable by a pair of painted lines. In another example scenario, the first parking spot is an unmarked parking spot.

At block 310, a determination is made whether any neighboring vehicles are present such as, for example, a second vehicle parked in a second parking spot and/or a third vehicle parked in a third parking spot. The second parking spot is located adjacent to the first parking spot on one longitudinal side of the vehicle and the third parking spot is located adjacent to the first parking spot on an opposing longitudinal side of the vehicle.

In an example implementation, a parking assistance system in the first vehicle may make the determination about the presence of neighboring vehicles based on evaluating one or more sensor signals received from one or more object sensors provided in the first vehicle. An example object sensor can be an ultrasonic sensor or a LIDAR device.

In another example implementation, the parking assistance system in the first vehicle may make the determination based on evaluating one or more images captured by one or more cameras provided in the first vehicle. An example camera may be mounted on the roof of the first vehicle.

If no neighboring vehicles are present, at block 315, the parking assistance system in the first vehicle may determine that repositioning of the first vehicle is unnecessary.

If either one or two neighboring vehicles are present, at block 320, door dimension information of the first vehicle and door dimension information of the neighboring vehicle (s) is obtained by the parking assistance system in the first vehicle. Door dimension information can include, for example, a longitudinal dimension of a door and a swing-out arc radius of a door.

In an example implementation, door dimension information of the first vehicle may be stored in a database of the parking assistance system in the first vehicle. The door dimension information stored in the database may be based on a model, make, and type of vehicle (sedan, truck, two-door, four-door, etc.). Door dimension information of the neighboring vehicle(s) may be stored, in some cases, in the database of the parking assistance system in the first vehicle, and in some other cases, in a database of a device located outside the vehicle and accessible, via wireless communications, to the parking assistance system in the first vehicle. Some examples of a device located outside the first vehicle include a server computer, a cloud computer, and a cloud storage device.

In an example implementation, a swing-out arc radius of a door may be determined by the parking assistance system in the first vehicle based on calculations involving the longitudinal dimension of the door and a swing-out angle of the door. In one case, a swing-out arc radius of one or more doors of the first vehicle (driver-side and passenger-side) may be determined by the parking assistance system based on empirical swing-out angle values. In an example scenario, the empirical swing-out angle values may be identified based on machine-learning procedures and/or based on obtaining measurements from one or more sensors over a period of time and over a number of door closing and opening actions. An example sensor that may be mounted upon a hinge of a door can be configured to detect an angle of swing of a door whenever the door is either opened or closed. A first driver of the first vehicle may have a personal preference as far as an extent of an outward swing of the driver-side door is concerned. A second driver of the first vehicle (if a second driver operates the first vehicle) may have a different personal preference. One or more passengers of the first vehicle may have their own personal preferences. The parking assistance system in the first vehicle may store information pertaining to such personal preferences in a database of the parking assistance system.

At block 325, a determination is made whether the first vehicle is parked in a parking spot that is identifiable by a pair of painted lines. In an example implementation, the parking assistance system in the first vehicle may make the determination based on one or more images captured by one or more cameras mounted on the first vehicle such as, for example, a camera mounted on an underbody or a bumper of the first vehicle.

If the first vehicle is parked in a parking spot that is identifiable by a pair of painted lines, at block 330, a position of the first vehicle in the parking spot is identified. In an example implementation, the parking assistance system in the first vehicle may make the determination based on one or more images captured by one or more cameras mounted on the first vehicle such as, for example, a camera mounted on an underbody or a bumper of the first vehicle. In an example scenario, the first vehicle may be located off-center, closer to one painted line than the other painted line. In another example scenario, the first vehicle may be skewed with respect to the pair of painted lines (parked at an angle inside the parking spot). In another example scenario, a portion of the first vehicle may be straddling a painted line. In another example scenario, a portion of the first vehicle may be protruding into a neighboring parking spot (which may, or may not, be occupied by another vehicle).

At block 335, the parking assistance system identifies a first separation distance between the first vehicle and a first neighboring vehicle, and a second separation distance between the first vehicle and a second neighboring vehicle (if a second neighboring vehicle is present). The separation distance(s) may be identified, either after making the determination that the first vehicle is parked in a parking spot that does not include painted lines (at block 325), or after identifying the position of the first vehicle in a parking spot that has painted lines (at block 330). In an example implementation, the separation distance(s) may be identified by the parking assistance system in the first vehicle based on evaluating one or more sensor signals received from one or more distance measuring sensors provided in the first vehicle. An example distance measuring sensor can be an ultrasonic sensor or a LIDAR device.

At block 340, a determination is made whether a repositioning of the first vehicles is recommended. The parking assistance system may make the determination based on one or more separation distances between the first vehicle and one or more neighboring vehicles, based on swing-out arc radii of one or more doors of the first vehicle, and/or based on swing-out arc radii of one or more doors of one or more neighboring vehicles. In an example implementation, the determination may be made by evaluating a swing-out radius of a door being opened to various extents (partially or fully) and comparing the swing-out radius to the separation distance. The likelihood of making undesirable contact between the door of a neighboring vehicle and a part of the first vehicle may be deemed to be high when the swing-out radius exceeds the separation distance. In this scenario, repositioning of the first vehicles is recommended.

If at block 340 it is determined that repositioning of the first vehicle is not recommended, at block 345, the first vehicle is left in a parking spot in which the first vehicle is parked currently, and no repositioning is carried out.

If at block 340 it is determined that repositioning of the first vehicle is recommended, at block 350, a determination is made whether repositioning of the first vehicle is feasible.

If repositioning of the first vehicle is not feasible, such as, for example, because of an acute angle at which a neighboring vehicle is parked, at block 355, the parking assistance system may provide a recommendation to a driver of the first vehicle (or a signal to an autonomous driving system of the first vehicle) to move the first vehicle to an alternative parking spot so as to avoid a door of the first vehicle making contact with the neighboring vehicle and/or a door of the neighboring vehicle making contact with the first vehicle.

If repositioning of the first vehicle is feasible, at block 360, the parking assistance system may provide a recommendation to a driver of the first vehicle (or a signal to an autonomous driving system of the first vehicle) to reposition the first vehicle in the first parking spot (current parking spot). In one example scenario, repositioning the first vehicle in the first parking spot may involve the driver of the first vehicle (or the autonomous driving system of the first vehicle) pulling the first vehicle out of the first parking spot and re-entering the first parking spot so as to park the first vehicle farther from a first neighboring vehicle, closer to the first neighboring vehicle, closer to a second neighboring vehicle, or at an angle with respect to one or more neighboring vehicles.

Figure 4:
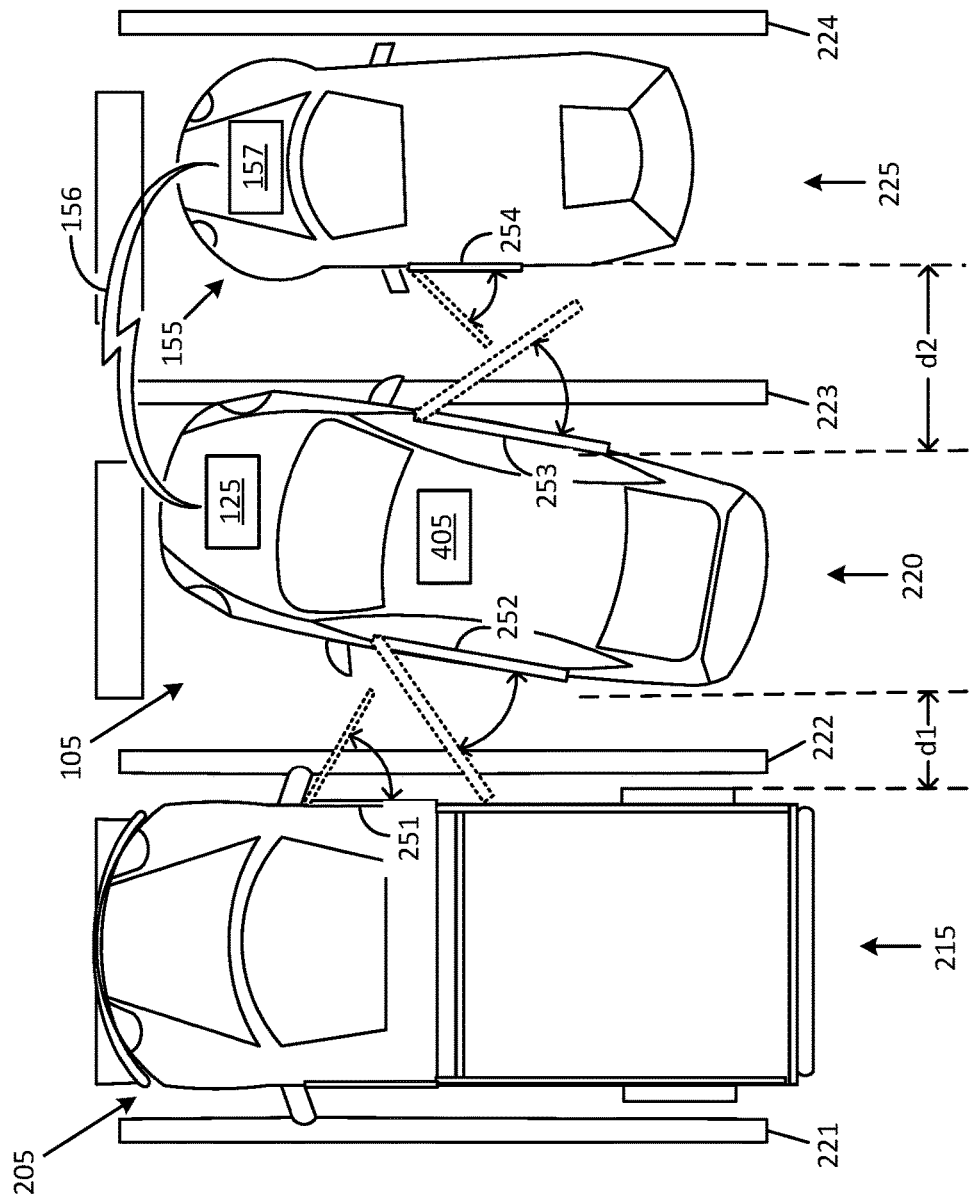
FIG. 4 shows a second example scenario to illustrate an operation of a parking assistance system of a vehicle in accordance with an embodiment of the disclosure.

FIG. 4 shows a second example scenario to illustrate an operation of the parking assistance system 125 of the vehicle 105 in accordance with an embodiment of the disclosure. More particularly, FIG. 4 shows a scenario that may be executed by the driver 150 of the vehicle 105 (if present) or the autonomous driving system 120 of the vehicle 105 upon receiving a recommendation from the parking assistance system 125 to reposition the vehicle 105 in the parking spot 220 that is shown in FIG. 2. One example of the parking assistance system 125 providing a recommendation to reposition a vehicle in a first parking spot is described above with reference to the flowchart 300 (at block 360).

In an example implementation, the parking assistance system 125 may provide the recommendation and may further provide assistance to the driver 150 and/or the autonomous driving system 120 to reposition the vehicle 105 in the parking spot 220. In one case, the assistance to the driver 150 may be provided in the form of audible instructions via the infotainment system 140 of the vehicle 105 and/or via the personal device 151 of the driver 150. Audible instructions can include, for example, "Pull into parking spot at an angle of 20 degrees," "Pull straight into parking spot while staying closer to right side painted line," "Pull up all the way till your front wheels touch the concrete block ahead," "Turn slightly to your left," "Slow down," and "Stop." One or more sensors, such as, for example, the distance measuring sensor 121 and/or the distance measuring sensor 122 provided in the vehicle 105, may provide signals to the driver 150 (a beeping signal, for example) to assist the driver 150 reposition the vehicle 105.

The assistance provided to the autonomous driving system 120 may involve conveying signals (instructions, commands, recommendations, etc.) from the parking assistance system 125 to the autonomous driving system 120 and/or to the vehicle computer 145 of the vehicle 105. One or more sensors, such as, for example, the distance measuring sensor 121 and/or the distance measuring sensor 122 provided in the vehicle 105, may provide sensor signals to the autonomous driving system 120 to assist the autonomous driving system 120 reposition the vehicle 105.

In one case, the autonomous driving system 120 may include, what is generally referred to as, an active park system or a park assist system that can reposition the vehicle 105 in the parking spot 220. Based on the nature of the active park system, the driver 150 may or may not be involved in moving the vehicle 105 when the vehicle 105 is being moved by the active park system.

In the example scenario illustrated in FIG. 4, the vehicle 105 is parked at an angle in the parking spot 220. The front end of the vehicle 105 is closer to the vehicle 155 in the parking spot 225 than to the vehicle 205 in the parking spot 215. The rear end of the vehicle 105 is closer to the vehicle 205 in the parking spot 215 than to the vehicle 155 in the parking spot 225. Furthermore, the vehicle 105 is closer to the painted line 223 than the painted line 222. The driver-side door 252 of the vehicle 105 no longer makes contact with the vehicle 205 when the driver-side door 252 is opened. The passenger-side door 251 of the vehicle 205 can also be opened without the passenger-side door 251 making contact with the vehicle 105. The passenger-side door 253 of the vehicle 105 can also be opened without the passenger-side door 253 making contact with the vehicle 155.

In an example repositioning operation, the autonomous driving system 120 may reposition the vehicle 105 into the illustrated position, without pulling out of the parking spot 220. In this case, the autonomous driving system 120 may perform the repositioning operation by using a zero-radius turn controller 405 provided in the vehicle 105. The zero-radius turn controller 405 can orient one or more wheels of the vehicle 105 in a first direction and one or more other wheels of the vehicle 105 in an opposite direction. For example, the zero-radius turn controller 405 can orient a pair of front wheels of the vehicle 105 to the right and rotate the front wheels in a clockwise direction to cause the front end of the vehicle 105 to move closer to the vehicle 155 and concurrently orient a pair of rear wheels of the vehicle 105 to the left and rotate the rear wheels in a counter-clockwise direction to cause the rear end of the vehicle 105 to move closer to the vehicle 205.

In another example repositioning operation, the parking assistance system 125 of the vehicle 105 may wirelessly communicate with the parking assistance system 157 of the vehicle 155 (via V2V communications, for example) to seek the cooperation of the parking assistance system 157. In this case, the parking assistance system 157 of the vehicle 155 (or an autonomous driving system of the vehicle 155) may maneuver the vehicle 155 further to the right and towards the painted line 224, so as to allow the parking assistance system 125 of the vehicle 105 to park the vehicle 105 in a manner whereby a portion of the vehicle 105 may, if necessary, protrude into the parking spot 225. Maneuvering the vehicle 155 may be carried out in any of several ways such as, for example, pulling out of the parking spot 225 and re-entering the parking spot 225 closer to the painted line 224, or by using zero-radius turn maneuvering (if available in the vehicle 155) without pulling out of the parking spot 225.

The parking assistance system 125 of the vehicle 105 may also wirelessly communicate with a parking assistance system of the vehicle 205 (if the vehicle 205 has one) to seek the cooperation of the parking assistance system of the vehicle 205 in lieu of, or in addition to, the cooperation of the parking assistance system 157 of the vehicle 155.

In some cases, the vehicle 105 may pre-empt and avoid door opening obstruction issues and/or door contact issues with one or more neighboring vehicles, prior to entering into the parking spot 220. The pre-emption may be carried out by evaluating various factors such as, for example, dimensional parameters of the parking spot 220 and the positions of the neighboring vehicle(s) in the neighboring parking spots (based on evaluating captured images, for example).

In a first example scenario, the evaluation of the parking spot 220 and the vehicles parked in the adjacent parking spots indicates that a full opening of the doors of the vehicle 105 may be feasible on both sides of the vehicle 105 without the opened doors coming in contact with the neighboring vehicles. In this case, the vehicle 105 may be pulled into the parking spot 220 such that the vehicle 105 is centered in the parking spot 220.

In a second example scenario, the vehicle 105 may be maneuvered into the parking spot 220 so as to allow full opening of a door on a driver side of the vehicle 105. The doors on the passenger side of the vehicle may be opened partially, which may, for example, be acceptable because no passenger is currently present in the vehicle 105 or the adjacent parking spot is unoccupied.

In a third example scenario, the vehicle 105 may be maneuvered into the parking spot 220 so as to allow full opening of a door on a passenger side of the vehicle 105 such as, for example, to allow a passenger to extract a piece of luggage from a rear seat of the vehicle 105. The driver door of the vehicle 105 may be opened sufficiently to allow the driver to exit the vehicle 105.

Figure 5:
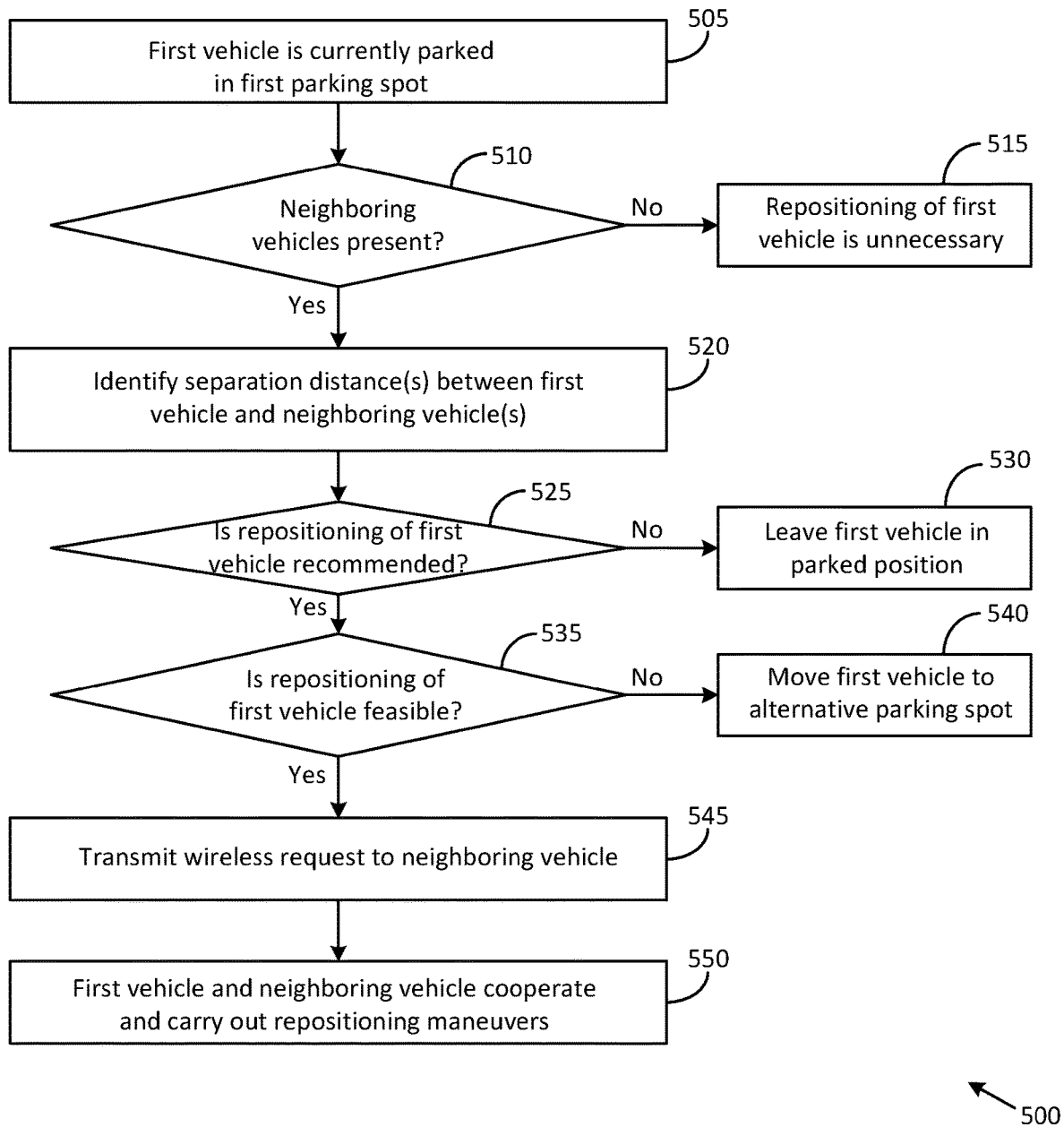
FIG. 5 shows a flowchart of another example method of operation of a parking assistance system in accordance with an embodiment of the disclosure.

FIG. 5 shows a flowchart 500 of another example method of operation of a parking assistance system in accordance with an embodiment of the disclosure. The description provided above with respect to block 305, block 310, and block 315 of FIG. 3, are equally applicable to block 505, block 510, and block 515 of FIG. 5 and will not be repeated here.

If either one or two neighboring vehicles are present, at block 520, the parking assistance system of the first vehicle identifies a first separation distance between the first vehicle and a first neighboring vehicle, and a second separation distance between the first vehicle and a second neighboring vehicle (if a second neighboring vehicle is present). In an example implementation, the parking assistance system in the first vehicle may make the determination based on evaluating one or more sensor signals received from one or more distance measuring sensors provided in the first vehicle. An example distance measuring sensor can be an ultrasonic sensor or a LIDAR device.

At block 525, a determination is made whether a repositioning of the first vehicles is required. The parking assistance system may make the determination based on one or more separation distances between the first vehicle and one or more neighboring vehicles, based on swing-out arc radii of one or more doors of the first vehicle, and/or based on swing-out arc radii of one or more doors of one or more neighboring vehicles.

If at block 525 it is determined that repositioning of the first vehicle is not required, at block 530, the first vehicle is left in a current parked state and no repositioning is carried out.

If at block 525 it is determined that repositioning of the first vehicle is required, at block 535, a determination is made whether repositioning of the first vehicle is feasible.

If repositioning of the first vehicle is not feasible, at block 540, the parking assistance system may provide a recommendation to a driver of the first vehicle (or a signal to an autonomous driving system of the first vehicle) to move the first vehicle to an alternative parking spot so as to avoid a door of the first vehicle making contact with a neighboring vehicle and/or a door of a neighboring vehicle making contact with the first vehicle.

If repositioning of the first vehicle is feasible, at block 545, the parking assistance system transmits a wireless request to a parking assistance system of a neighboring vehicle. The wireless request may seek the cooperation of the parking assistance system to reposition the first vehicle in the parking spot.

At block 550, the first vehicle and the neighboring vehicle cooperate with each other in performing repositioning maneuvers. In an example scenario, the parking assistance system of the neighboring vehicle may move the neighboring vehicle further away from a first longitudinal side of the first vehicle. The increased separation distance between the first vehicle and the neighboring vehicle allows the parking assistance system of the first vehicle to perform maneuvers such as, for example, park the first vehicle at an angle in the parking spot, to increase a separation distance between the first vehicle and another vehicle parked adjacent to the first vehicle on the other longitudinal side of the first vehicle, or park the first vehicle in a manner whereby a portion of the first vehicle protrudes into an adjacent parking spot.

Figure 6:
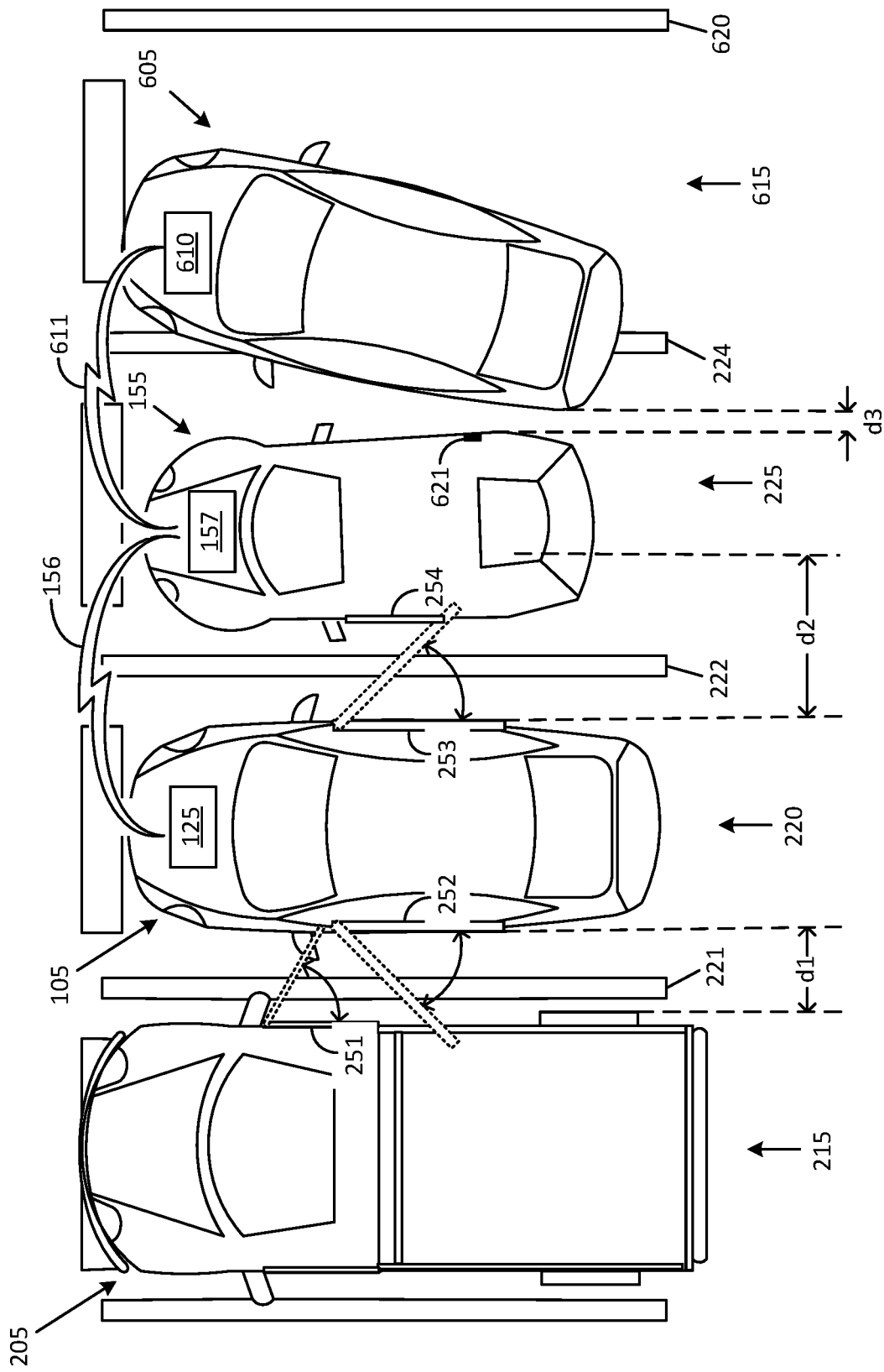
FIG. 6 shows a third example scenario to illustrate an operation of a parking assistance system in accordance with an embodiment of the disclosure.

FIG. 6 shows a third example scenario to illustrate an operation of the parking assistance system 125 of the vehicle 105 in accordance with an embodiment of the disclosure. More particularly, FIG. 6 shows a scenario that may follow the action described above with reference to block 550 of the flowchart 500 (FIG. 5). In this example illustration, the first vehicle referred to in the flowchart 500 is the vehicle 105 and the neighboring vehicle is the vehicle 155. In this third example scenario, the neighboring vehicle referred to in the flowchart 500 is unable to provide more room to the vehicle 105 for allowing the parking assistance system 125 of the vehicle 105 to reposition the vehicle 105 in the parking spot 220. The inability of the vehicle 155 to provide more room to the vehicle 105 is due to the presence of another vehicle 605 that is improperly parked at an angle in a parking spot 615 that is adjacent to the parking spot 225 in which the vehicle 155 is parked. More particularly, the vehicle 605 straddles the painted line 224 that represents a boundary between the parking spot 225 and the parking spot 615.

In an example scenario, each of the vehicle 105, the vehicle 155, and the vehicle 605 can be an autonomous vehicle that can perform various actions autonomously without human involvement such as, for example, autonomously communicate with devices located outside the autonomous vehicle and move around autonomously even when no human occupant is present in the autonomous vehicle (such as, for example, when the autonomous vehicle is left parked unattended in a parking lot).

In some cases, one or more of the autonomous vehicles (or driver-operated vehicles) can carry out parking operations by use of an automated valet parking system of the vehicle. The automated valet parking system is a driverless system that may park a vehicle in an open parking spot by use of infrastructure information, for example. The infrastructure information may be obtained from infrastructure communication devices (in a garage, for example).

A sensor 621 (such as, for example, an object detector or a distance measuring sensor) provided in the vehicle 155 may detect a presence of the vehicle 605 and a separation distance "d3" between the vehicle 155 and the vehicle 605. The parking assistance system 157 of the vehicle 155 may evaluate the separation distance "d3" and make a determination that there is not enough room for the vehicle 155 to move towards the painted line 224 of the parking spot 225 because of the positioning of the vehicle 605. In this scenario, the parking assistance system 157 of the vehicle 155 may transmit a wireless request to a parking assistance system 610 of the vehicle 605. The wireless request, which may be made, for example, via V2V communications over a wireless link 611, may seek the cooperation of the parking assistance system 610 of the vehicle 605 to reposition the vehicle 605. Repositioning the vehicle 605 may involve one or more actions such as straightening out the vehicle 605, parking the vehicle 605 midway between the painted line 224 and the painted line 620, and/or parking the vehicle 605 closer to the painted line 620.

Once the vehicle 605 is repositioned, the vehicle 155 may perform maneuvers to assist the vehicle 105 in the manner described above with respect to block 550 of the flowchart 500. In an example scenario, the parking assistance system 610 of the vehicle 605 may determine that it is not feasible to reposition the vehicle 605 such as, for example, due to the presence of another vehicle (not shown) that is parked in an improper manner in a parking spot located adjacent to the parking spot 615. The parking assistance system 610 may communicate with a parking assistance system of the other vehicle to seek the cooperation of the other vehicle. This procedure of seeking cooperation from neighboring vehicles can be propagated in either direction over any number of vehicles in a procedure that can be referred to as an autonomous cascaded parking procedure in accordance with the disclosure.

Figure 7:
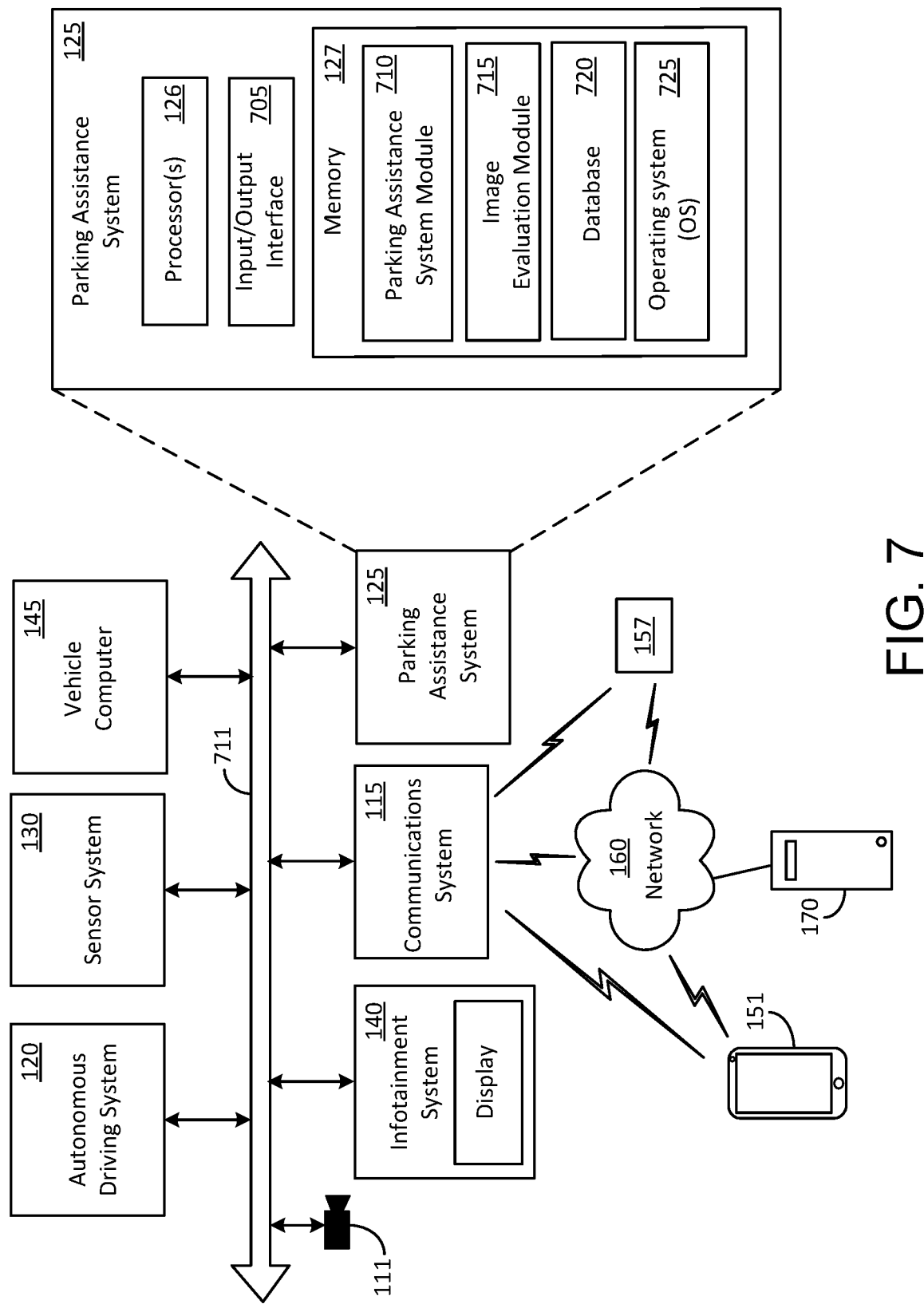
FIG. 7 shows some example components that can be included in a vehicle in accordance with an embodiment of the disclosure.

FIG. 7 shows some example components that may be included in the vehicle 105 in accordance with an example embodiment of the disclosure. The example components may include the parking assistance system 125, the autonomous driving system 120, the sensor system 130, the vehicle computer 145, the infotainment system 140, the communication system 115, and one more cameras (such as, for example, the camera 111). Some aspects of these components have been described above.

The various components are communicatively coupled to each other via one or more buses such as an example bus 711. The bus 711 may be implemented using various wired and/or wireless technologies. For example, the bus 711 can be a vehicle bus that uses a controller area network (CAN) bus protocol, a Media Oriented Systems Transport (MOST) bus protocol, and/or a CAN flexible data (CAN-FD) bus protocol. Some or all portions of the bus 711 may also be implemented using wireless technologies such as Bluetooth®, Zigbee®, or near-field-communications (NFC).

The communication system 115 can include devices such as, for example, one or more transceivers configured to enable communications between the parking assistance system 125 and various devices located outside the vehicle 105, such as, for example, the personal device 151, the server computer 170, the cloud computer 165, and one or more parking assistance systems in other vehicles such as, for example, the parking assistance system 157 in the vehicle 155. The communications may be carried out either via the network 160 or directly (V2V communications, cellular communications, etc.).

The communications system 115 may use one or more communication technologies such as Bluetooth, cellular, near-field communication (NFC), Wi-Fi, Wi-Fi direct, machine-to-machine communication, and/or man-to-machine communication to communicate with the various devices.

The parking assistance system 125 can include an input/output interface 705 that is configured to allow the parking assistance system 125 to exchange various types of information, images, and signals, with components such as the camera 111, the sensor system 130, the autonomous driving system 120, and the vehicle computer 145.

The parking assistance system 125 can further include the processor 126 and the memory 127. The memory 127, which is one example of a non-transitory computer-readable medium, may be used to store an operating system (OS) 725, a database 720, and code modules such as a parking assistance system module 710 and an image evaluation module 715.

The code modules are provided in the form of computer-executable instructions that can be executed by the processor 126 for performing various operations in accordance with the disclosure.

In one example implementation, the parking assistance system module 710 may be executed by the processor 126 for executing various operations such as the actions described above with reference to the flowchart 300 and the flowchart 500. The image evaluation module 715 may be executed by the processor 126 to evaluate images provided by the cameras, such as, for example, to evaluate an image to identify painted lines of a parking spot.

The database 720 may contain information such as, for example, door dimension information of the vehicle 105 and of other vehicles.

Figure 8A:
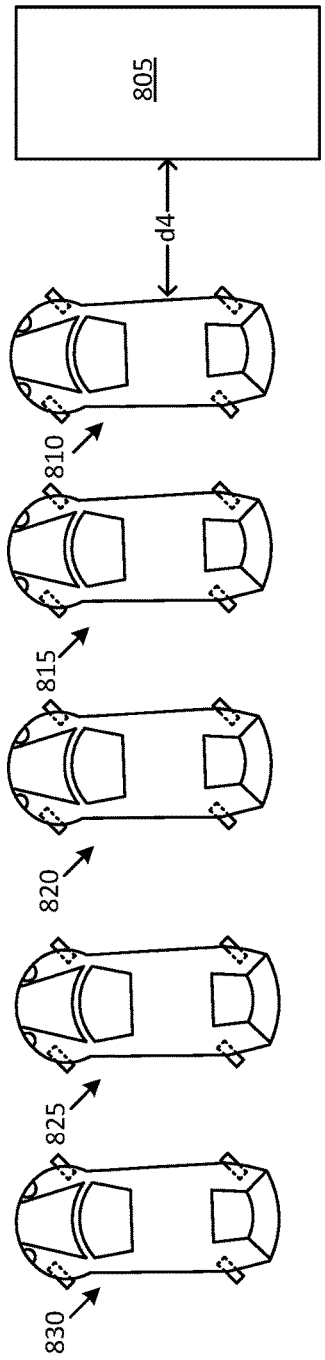
FIGS. 8A-8C illustrate a horizontal vehicle packing procedure in accordance with an embodiment of the disclosure.
Figure 8B:
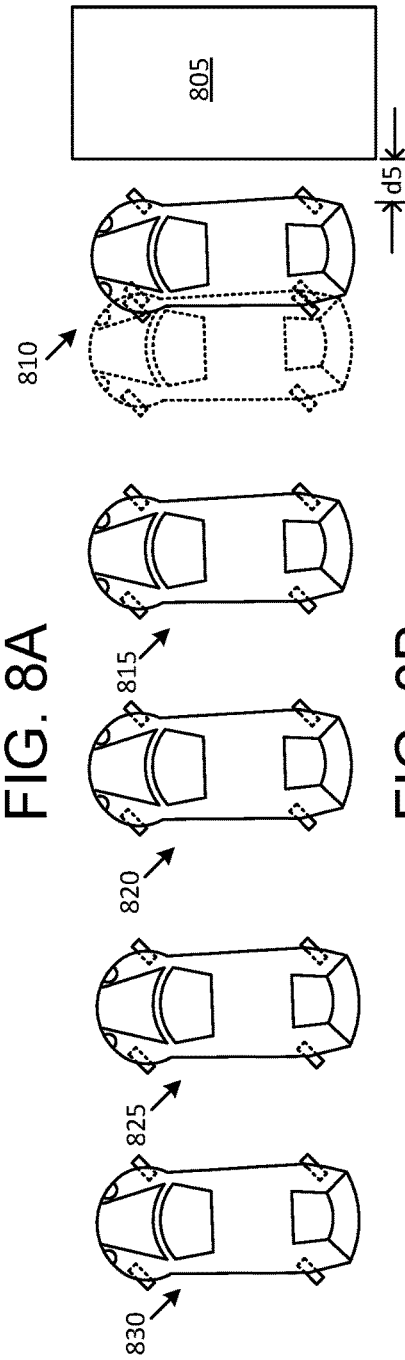
Figure 8C:
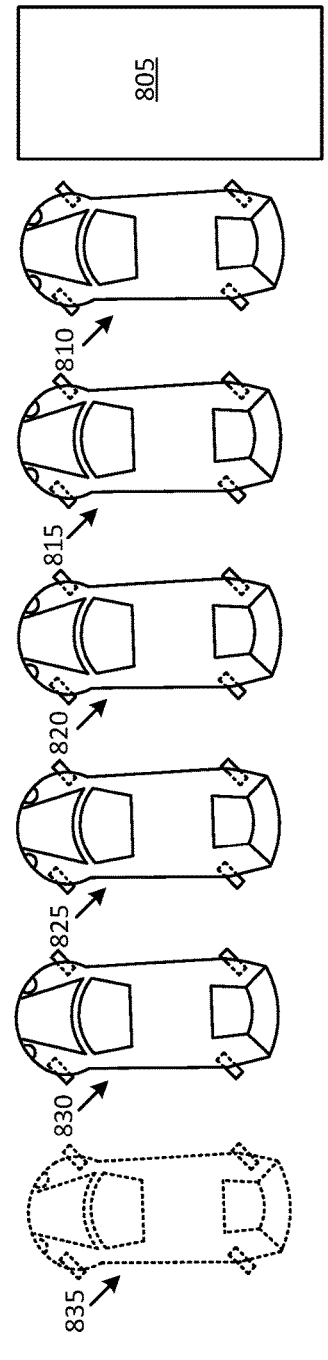

FIGS. 8A-8C illustrate a horizontal vehicle packing procedure in accordance with an embodiment of the disclosure. FIG. 8A illustrates several vehicles parked side-by-side in an unmarked parking area. Each of the vehicles is equipped with a zero-radius turn controller (such as the zero-radius turn controller 405 described above with reference to FIG. 4) and may further include a valet park feature that allows each vehicle to execute various maneuvers to park and/or re-park the vehicle in an autonomous manner without human intervention. The zero-radius turn controller allows each vehicle to move sideways in either direction in a crab-like manner. In the illustrated scenario, a vehicle 810 is located next to a structure 805 (building, wall, sidewalk, etc.). A separation distance "d4" between the vehicle 810 and the structure 805 may be inadequate to accommodate another vehicle, and as such, constitutes wasted space that can be utilized in accordance with the disclosure.

An example procedure to do so, which is illustrated in FIG. 8B, involves the vehicle 810 moving sideways (using the zero-radius turn controller) closer to the structure 805. The vehicle 810 is then stopped and parked close to the structure 805 that is now separated from the vehicle 810 by a distance "d5" that is less than "d4." One or more distance measuring sensors provided on the sides of the vehicle 810 (in this case, a distance measuring sensor provided on the passenger side of the vehicle 810) may be used to identify separation distances such as, for example, the distance "d5," in order to perform the re-parking maneuver.

The vehicle 810 may wirelessly communicate (via V2V communications, for example) with the vehicle 815 and provide an indication that the vehicle 815 is now free to move closer to the vehicle 810. The vehicle 815 may then moves sideway towards the vehicle 810 and park closer to the vehicle 810 than before. Each of the other vehicles (vehicle 820, followed by vehicle 825, and vehicle 830) execute a similar maneuver to sequentially move closer together with respect to each other (wireless communications, followed by sideways movement).

FIG. 8C illustrates a new parking configuration as a result of the horizontal vehicle packing procedure. A vacated space obtained on the driver side of the vehicle 830 may now be used for parking an additional vehicle 835.

Figure 9B:
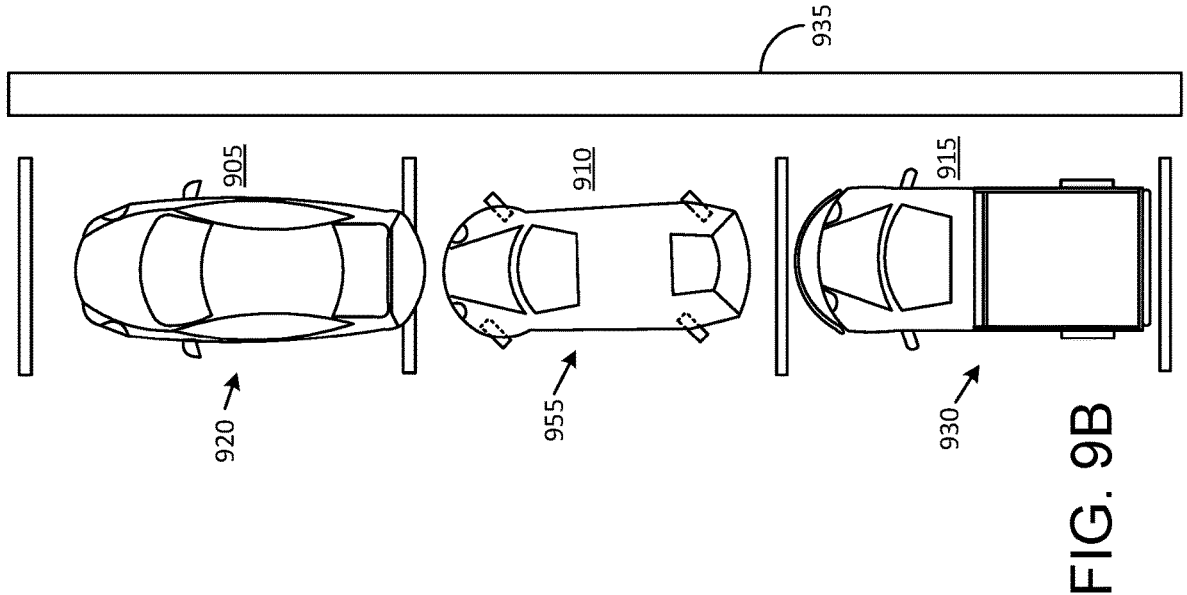
FIGS. 9A and 9B illustrate a fifth example scenario to illustrate an operation of a parking assistance system of a vehicle in accordance with an embodiment of the disclosure.
Figure 9A:
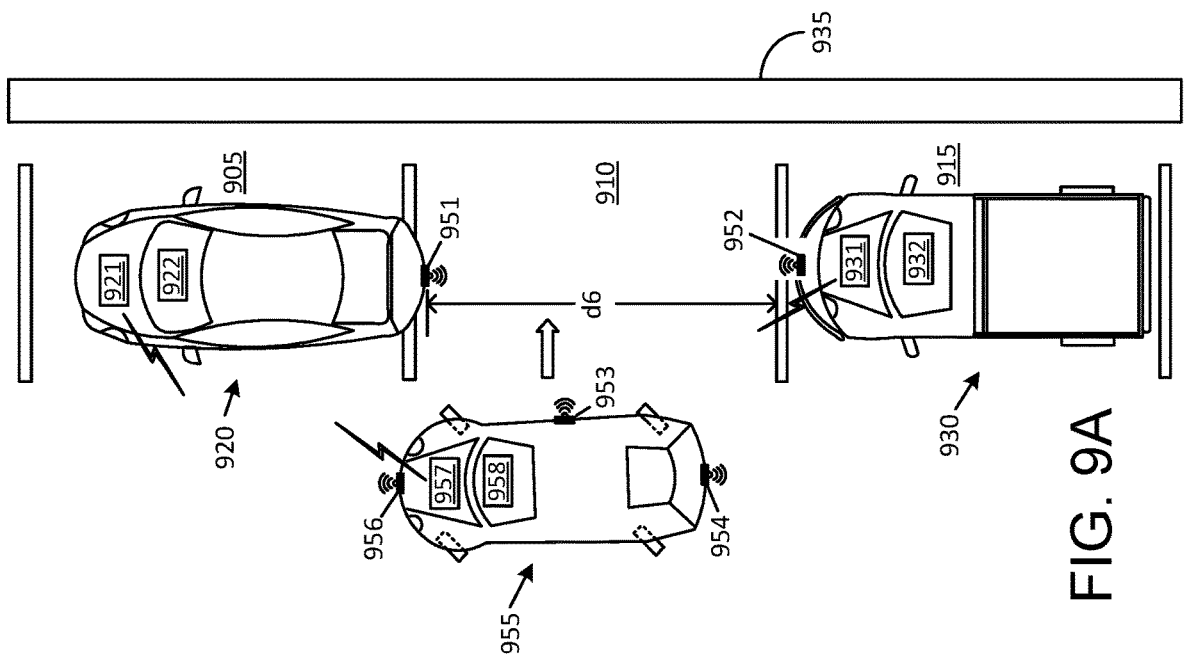

FIGS. 9A and 9B illustrate a fifth example scenario pertaining to operation of a parking assistance system of a vehicle in accordance with an embodiment of the disclosure. FIG. 9A illustrates a scenario in which a vehicle 955 is seeking to parallel park between a vehicle 920 parked in a parking spot 905 and a vehicle 930 parked in a parking spot 915. The vehicle 955 is an autonomous vehicle equipped to perform a zero-radius turn maneuver for sliding into a parking spot 910 located between the parking spot 905 and the parking spot 915.

A rear end of the vehicle 920 is partially protruding into the parking spot 910, thereby leading to an uncertainty whether the vehicle 955 would have adequate clearance to park in the parking spot 910. An adequate clearance may, for example, be equal to at least one and a half times a length of the vehicle 955. A parallel parking procedure in accordance with the disclosure may be carried out by a parking assistance system 958 of the vehicle 955. The procedure includes the parking assistance system 958 transmitting a request to the vehicle 920 seeking the cooperation of a parking assistance system 922 of the vehicle 920 to carry out a parallel parking maneuver. The request may be transmitted wirelessly via a communication system 957 of the vehicle 955 to a communication system 921 of the vehicle 920.

The parking assistance system 922 of the vehicle 920 may respond to the request by carrying out a distance measuring procedure between the rear end of the vehicle 920 and a front end of the vehicle 930. In an example implementation, the distance measuring procedure may be carried out by utilizing a distance measuring sensor 951, which can be, for example, an ultrasonic detector, a radar detector, a sonar detector, or a LIDAR device mounted upon a rear bumper of the vehicle 920. A separation distance "d6" between the vehicle 920 and the vehicle 930 that is measured by utilizing the distance measuring sensor 951 may be conveyed by the parking assistance system 922 of the vehicle 920 (via the communication system 921) to the parking assistance system 958 of the vehicle 955 (via the communication system 957).

In an example embodiment, the parking assistance system 958 of the vehicle 955 may further utilize the communication system 957 to wirelessly communicate with a communication system 931 of the vehicle 930 to make a request seeking the cooperation of a parking assistance system 932 of the vehicle 930 to carry out the parallel parking maneuver. Seeking the cooperation of a parking assistance system 932 of the vehicle 930 may be optional in some implementations.

The parking assistance system 932 of the vehicle 930 may respond to the request by executing a distance measuring procedure by use of a distance measuring sensor 952, which can be, for example, an ultrasonic detector, a radar detector, a sonar detector, or a LIDAR device mounted upon a front bumper of the vehicle 930. The separation distance "d6" between the vehicle 920 and the vehicle 930 that is measured by utilizing the distance measuring sensor 952 may be conveyed by the parking assistance system 922 of the vehicle 920 (via the communication system 931) to the parking assistance system 958 of the vehicle 955 (via the communication system 957). In an example embodiment, the parking assistance system 922 of the vehicle 920 may use the measurement provided by use of the distance measuring sensor 952 to confirm the measurement provided by use of the distance measuring sensor 951.

The parking assistance system 922 of the vehicle 920 may then make a determination whether the separation distance "d6" is adequate to allow the vehicle 955 to move into the parking spot 910. In an example embodiment, the determination can include ensuring that the separation distance "d6" is greater than a longitudinal dimension (front-to-back) of the vehicle 955 by a margin. The margin may be set on the basis of various factors including, for example, a range of movements that the vehicle 955 may employ when executing a zero-radius turn maneuver for sliding into the parking spot 910.

If the determination made by the parking assistance system 922 indicates that the separation distance "d6" is adequate, the vehicle 920 remains stationary and transmits a message to the parking assistance system 958 of the vehicle 955 to proceed with parallel parking. The parking assistance system 922 of the vehicle 920 may then execute the zero-radius turn maneuver to move sideways into the parking spot 910.

In some cases, signals provided by a distance measuring sensor 953 provided on a side panel of the vehicle 955 and/or images provided by one or more cameras provided on the vehicle 955 may be evaluated by the parking assistance system 922 to ensure that the vehicle 955 is parked at an appropriate distance from a structure 935 (building, sidewalk, etc.). If so desired, a distance measuring sensor 956 may be used to determine a separation distance between a front end of the vehicle 955 and a rear end of the vehicle 920. A distance measuring sensor 954 may be used to determine a separation distance between a rear end of the vehicle 955 and a front end of the vehicle 930.

If the determination made by the parking assistance system 922 indicates that the separation distance "d6" is inadequate, the vehicle 920 may move forward so as to increase the separation distance "d6." The greater separation distance "d6" may be measured once again (by use of the distance measuring sensor 951 and/or the distance measuring sensor 952) and provided to the parking assistance system 922 for determining whether the greater separation distance "d6" is adequate to allow the vehicle 955 to move into the parking spot 910.

FIG. 9B shows the vehicle 955 parked in the parking spot 910 upon completion of the parallel parking maneuver described above.

Figure 10B:
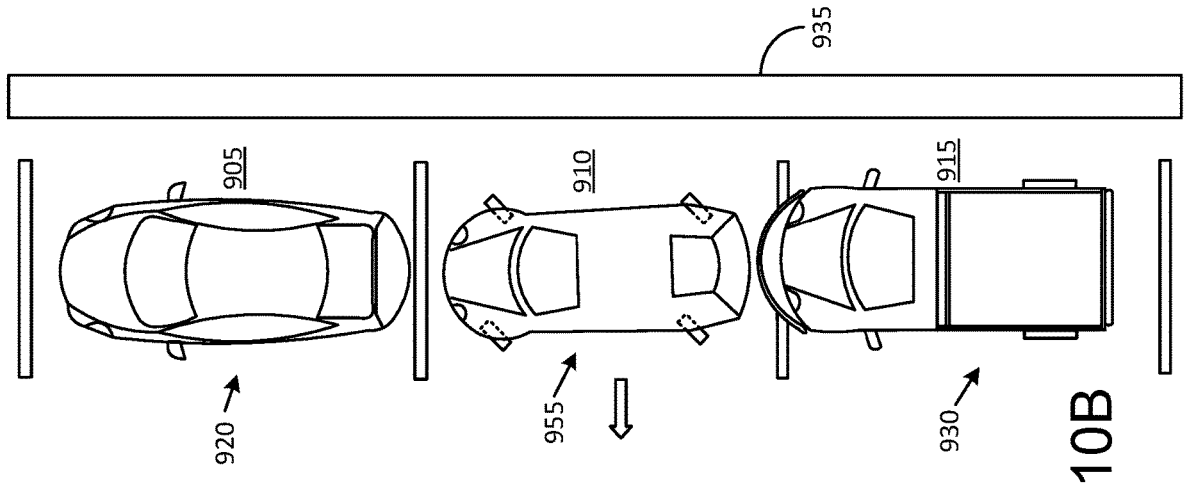
FIGS. 10A and 10B illustrate a sixth example scenario to illustrate an operation of a parking assistance system of a vehicle in accordance with an embodiment of the disclosure.
Figure 10A:
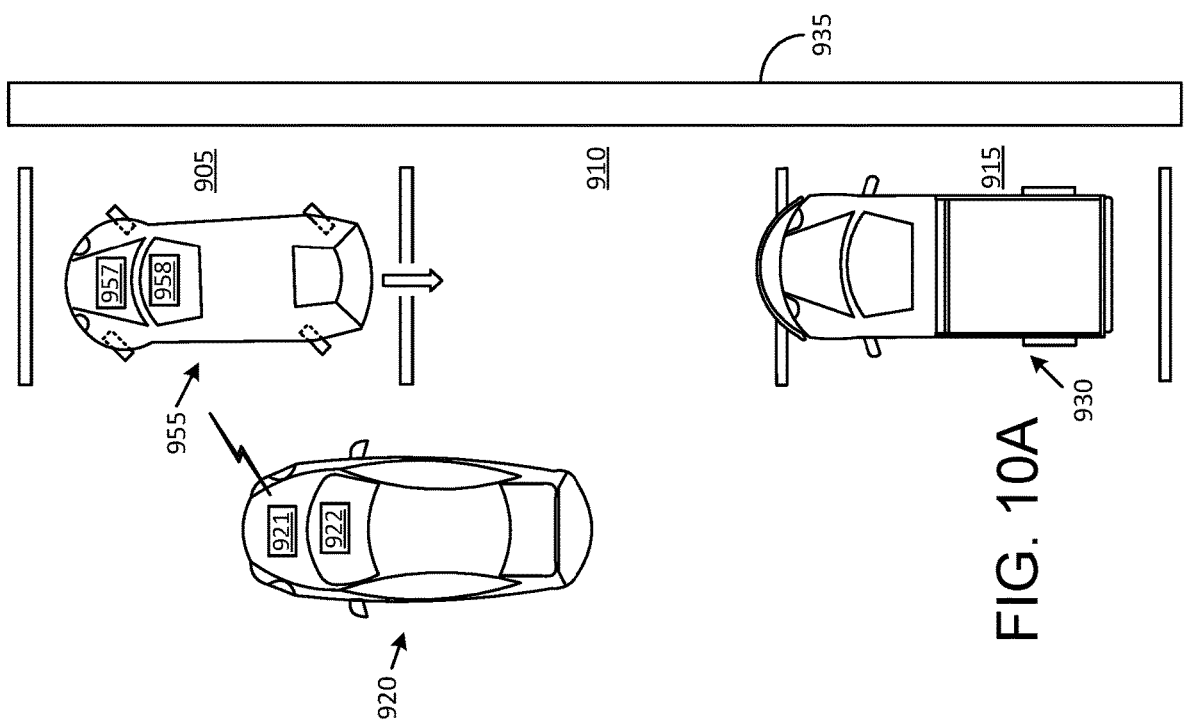

FIGS. 10A and 10B illustrate a sixth example scenario to illustrate an operation of a parking assistance system of a vehicle in accordance with an embodiment of the disclosure. In this scenario, the vehicle 955 that has the zero-radius turn capability, is currently parked in the parking spot 905 and the vehicle 930, which may, or may not have zero-radius turn capability, is parked in the parking spot 915. The vehicle 920, which does not have zero-radius turn capability, is seeking a parking spot.

A front end of the vehicle 930 may be protruding into the parking spot 910 thereby curtailing an amount of space available to the vehicle 920 to perform a parallel parking procedure to park in the parking spot 910. In this scenario, the parking assistance system 922 of the vehicle 920 may convey to the parking assistance system 958 of the vehicle 955, an indication of the inability of the vehicle 920 to park in the parking spot 910 and may seek assistance from the parking assistance system 958. The parking assistance system 958 of the vehicle 955 may respond to the communication by offering to vacate the parking spot 905 by moving backwards into the parking spot 910. Upon completion of the backwards motion and parking in the parking spot 910, the vehicle 920 moves into the parking spot 905 that was vacated by the vehicle 955.

FIG. 10B illustrates the vehicle 955 parked in the parking spot 910. Unlike the vehicle 920 that lacks the zero-radius turn capability and is incapable of either entering the parking spot 910 or exiting the parking spot 910 (if parked in the parking spot 910 prior to arrival of the vehicle 930 into the parking spot 915), the vehicle 955 can exit the parking spot 910 by executing a zero-radius turn maneuver to move out of the parking spot 910 sideways.

It must be understood that the parking sequence described above with reference to three vehicles (the vehicle 920, the vehicle 955, and the vehicle 930) and three parking spots (the parking spot 905, the parking spot 910, and the parking spot 915) can be extended to more than three vehicles and more than three parking spots. Accordingly, in an example scenario, two or more vehicles having zero-radius turn capability may cooperate with two or more other vehicles that lack zero-radius turn capability to park in an interspersed manner whereby each of the two or more vehicles having zero-radius turn capability can exit a parking spot sideways by use of the zero-radius turn capability. It must also be understood that the parking sequence described above with reference to three vehicles and three parking spots can be extended to any number of vehicles in any parking area (such as, for example, an unmarked parking area) to execute a vertical packing procedure to pack the vehicles closer to each other along a longitudinal axis. The vertical packing procedure can be understood in view of the horizontal packing procedure described above with reference to FIGS. 8A through 8C. More particularly, with reference to FIG. 10B, a vertical packing procedure may involve the three vehicles communicating with each to first move the vehicle 930 backwards, followed by the vehicle 955 backwards (closer to the vehicle 930), followed by the vehicle 920 backwards (closer to the vehicle 955), thereby making room in the parking spot 905 for an additional vehicle. Each of the vehicles that is equipped with the zero-radius turn capability (and parked between two vehicles that do not have the zero-radius turn capability) can exit a parking spot by moving sideways out of the parking spot.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a first processor of a first parking assistance system in a first vehicle, from one or more sensing devices, one or more sensor signals;
   determining, by the first processor, based on the one or more sensor signals, a first position of the first vehicle in a first parking spot and a first separation distance between the first vehicle and a second vehicle that is parked in a second parking spot located adjacent to the first parking spot;
   determining, by the first processor and based on the first position and the first separation distance, that there is insufficient room to open a door of the first vehicle;
   determining, by the first processor, that the first vehicle is to be repositioned within the first parking lot;
   sending, by the first processor to a second processor of the second vehicle, a message to cooperate with repositioning of the first vehicle;
   operating, by the first processor, a zero-radius turn controller of a first autonomous driving system of the first vehicle to move the first vehicle; and
   causing a second autonomous driving system of the second vehicle to move the second vehicle, wherein the second vehicle does not include a zero-radius turn controller.

2. The method of claim 1, wherein the second parking spot is located adjacent to the first parking spot on a first side of the first vehicle, and wherein the method further comprises:
   determining, by the first processor, based on the one or more sensor signals, a second separation distance between the first vehicle and a third vehicle that is parked in a third parking spot located adjacent to the first parking spot; and
   operating, by the first processor, to the first autonomous driving system of the first vehicle to reposition the first vehicle in the first parking spot, based, in further part, on the second separation distance between the first vehicle and the third vehicle.

3. The method of claim 2, wherein the one or more sensing devices include a first distance measuring sensor provided in the first vehicle, the first distance measuring sensor configured to measure the first separation distance between the first vehicle and the second vehicle.

4. The method of claim 3, wherein determining the first position further comprising:
   receiving, by the first processor, from an imaging device, an image comprising a pair of painted lines that identify the first parking spot; and
   determining, by the first processor, based on evaluating the image, the first position of the first vehicle with respect to the pair of painted lines.

5. The method of claim 2, wherein the third vehicle is an autonomous vehicle, and wherein the method further comprises:
   establishing, by the first processor, vehicle-to-vehicle communications with at least one of a second parking assistance system in the second vehicle or a third parking assistance system in the third vehicle; and
   causing repositioning, of at least one of the second vehicle or the third vehicle based on the vehicle-to-vehicle communications.

6. The method of claim 1, further comprising: placing the first vehicle at a second separation distance from the second vehicle, wherein the second separation distance is larger than the first separation distance.

7. The method of claim 6, wherein determining that there is insufficient room to open a door of the first vehicle is based, at least in part, one of a first dimension of a door of the first vehicle or a second dimension of a door of the second vehicle.

8. The method of claim 6, wherein determining that there is insufficient room to open a door of the first vehicle is based, at least in part, on one of a first swing out arc radius of a door of the first vehicle or a second swing out arc radius of a door of the second vehicle.

9. A method comprising:
   determining, by a first processor of a first parking assistance system in a first vehicle, at least one of a first swing out arc radius of a first door of the first vehicle or a second swing out arc radius of a second door of a second vehicle, wherein the first vehicle is parked in a first parking spot and the second vehicle is parked in a second parking spot immediately adjacent to the first parking spot;
   receiving, by the first processor, from an imaging device, an image comprising a pair of painted lines that identify the first parking spot;
   determining, by the first processor, based on evaluating the image, the first position of the first vehicle with respect to the pair of painted lines;
   determining, by the first processor based on the first position, that there is insufficient room to open the first door or the second door;
   sending, by the first processor, a message to an autonomous driving system of the second vehicle requesting cooperation in repositioning the second vehicle;
   autonomously moving, by the first processor, the first vehicle to reposition the first vehicle in the first parking spot; and
   causing, by the first processor, the autonomous driving system of the second vehicle to reposition the second vehicle within the second parking spot such that there is sufficient room to open the first door or the second door.

10. The method of claim 9, further comprising:
    receiving, by the first processor, from one or more sensing devices, one or more sensor signals;

determining, by the first processor, based on the one or more sensor signals, a first position of the first vehicle in the first parking spot and a first separation distance between the first vehicle and the second vehicle; and wherein autonomously moving the first vehicle is further based on, the first separation distance between the first vehicle and the second vehicle.

11. The method of claim 10, wherein the second parking spot is located on a first side of the first vehicle, and wherein the method further comprises:

determining, by the first processor, based on the one or more sensor signals, a second separation distance between the first vehicle and a third vehicle that is parked in a third parking spot located adjacent to the first parking spot on a second side of the first vehicle; and wherein autonomously moving the first vehicle is, further based on the second separation distance between the first vehicle and the third vehicle.

12. The method of claim 11, wherein the one or more sensing devices includes a first distance measuring sensor provided in the first vehicle and a second distance measuring sensor provided in the first vehicle, the first distance measuring sensor configured to measure the first separation distance between the first vehicle and the second vehicle, and the second distance measuring sensor configured to measure the second separation distance between the first vehicle and the third vehicle.

13. The method of claim 9, further comprising:

establishing, by the first parking assistance system, communications with at least one of a second parking assistance system of the second vehicle, a vehicle computer of the second vehicle, or a server computer; and obtaining, by the first parking assistance system, from the at least one of the second parking assistance system of the second vehicle, the vehicle computer of the second vehicle, or the server computer, information about the second swing out arc radius of the door of the second vehicle.

14. The method of claim 9, wherein autonomously moving the first vehicle further comprises operating, by the first processor, a zero-radius turn controller of the first vehicle and wherein the second vehicle does not include a zero-radius turn controller.

15. A first autonomous vehicle comprising:
a sensor system;
a zero-radius turn controller; and
a first parking assistance system comprising:
a first memory that stores computer-executable instructions; and
a first processor configured to access the first memory and execute the computer-executable instructions to perform operations comprising:
receiving, from the sensor system, at least a first sensor signal;
determining, based on the at least the first sensor signal, a first separation distance between the first vehicle that is in a first parking spot and a second autonomous vehicle that is parked in a second parking spot located immediately adjacent to the first parking spot;

determining, based on the first separation distance that there is insufficient room to open a first door of the first vehicle or a second door of the second vehicle;

sending a message to the second autonomous vehicle requesting cooperation in repositioning the first vehicle in the first parking spot;

autonomously moving the first vehicle, using the zero-radius turn controller, to reposition the first vehicle in the first parking spot; and causing the second vehicle to autonomously move to reposition the second vehicle within the second parking spot, wherein the second vehicle does not include a zero-radius turn controller.

16. The first autonomous vehicle of claim 15, wherein the sensor system includes a distance measuring sensor configured to measure the first separation distance between the first vehicle and the second vehicle.

17. The first autonomous vehicle of claim 15, wherein the sensor system includes an imaging device, and wherein the first processor is configured to access the first memory and execute the computer-executable instructions to perform further operations comprising:

receiving, from the imaging device, an image comprising a pair of painted lines that identify the first parking spot; and determining, based on evaluating the image, a first position of the first vehicle with respect to the pair of painted lines.

18. The first autonomous vehicle of claim 15, wherein the first vehicle further comprises an autonomous driving system, and wherein the first processor is configured to access the first memory and execute the computer-executable instructions to perform further operations comprising:

determining at least one of a first swing out arc radius of the first door or a second swing out arc radius of the second door; and wherein determining that there is insufficient room is further based on the first swing out arc radius or the second swing out arc radius.

19. The first autonomous vehicle of claim 18, wherein the first vehicle further comprises a wireless communication system, and wherein the first processor is configured to access the first memory and execute the computer-executable instructions to perform further operations comprising:

obtaining from at least one of a second parking assistance system of the second vehicle, a vehicle computer of the second vehicle, or a server computer, information about the second swing out arc radius.

20. The first autonomous vehicle of claim 18, wherein the first processor is configured to access the first memory and execute the computer-executable instructions to perform further operations comprising:

determining, after the repositioning of the first vehicle or the second vehicle, a second separation distance between the first autonomous vehicle and the second autonomous vehicle, wherein the second separation distance is larger than the first separation distance.

* * * * *